United States Patent [19]

Mihara et al.

[11] 4,398,295

[45] Aug. 9, 1983

[54] APPARATUS FOR REGENERATING ACTIVATED CARBON

[75] Inventors: Osamu Mihara, Fujisawa; Toyoji Kumada, Kyoto, both of Japan

[73] Assignee: Sangiken Ltd., Tokyo, Japan; by said Toyoji Kumada

[21] Appl. No.: 269,899

[22] Filed: Jun. 3, 1981

[51] Int. Cl.³ ............................................. H05B 3/60
[52] U.S. Cl. ..................................... 373/120; 373/116
[58] Field of Search .............. 373/120, 109, 115, 116, 373/122, 135; 252/411 R

[56] References Cited

U.S. PATENT DOCUMENTS 4,127,737 11/1978 Hirakawa ......................... 373/120 X Primary Examiner—Roy N. Envall, Jr.
Attorney, Agent, or Firm—Robert E. Burns; Emmanuel J. Lobato; Bruce L. Adams

[57] ABSTRACT

Apparatus for regenerating activated carbon comprises a desorption tank having at its bottom an elongate channel-form passage sloping downwardly from an inlet end to an outlet end. A pulse voltage is applied to electrodes extending along the passage to regenerate the activated carbon as it flows from the inlet to the outlet. Flow of the activated carbon is intercepted by transverse weirs provided at spaced intervals along the length of the passage. An oscillatory swinging motion imparted to the tank by eccentrics on a rotating shaft promotes flow of the activated carbon along the passage from the inlet to the outlet and in particular causes carbon particles which have become lighter by virtue of regeneration to pass preferentially over the weirs and thereby progress more rapidly toward the outlet.

4 Claims, 5 Drawing Figures

APPARATUS FOR REGENERATING ACTIVATED CARBON

Technical Field of the Invention

This invention relates to apparatus for regenerating used activated or active carbon.

BACKGROUND OF THE INVENTION

The purification treatment of waste gas or water discharged from factories and other facilities has been an important problem for a long time, and recently it became a more urgent problem, as the polution problem became a subject of much discussion. Many processes of treating waste gas or water have been proposed, but among these a process of using active carbon is widely adopted.

Active carbon is a favorable reagent because of its strong adsorptive power, but it must be regenerated in case of reuse, when it becomes inactive as the adsorption goes on and it becomes saturated with adsorbed matter. In the conventional method for activating and regenerating used active carbon, the same is heated, as for instance, in an oil fired rotary kiln at a temperataure of 800° C. or higher, and water vapor is introduced concurrently to regenerate the carbon by a process of water gas reaction.

However, this method requires prolonged heating at such high temperature, so that it needs a considerable amount of fuel, as well as an expensive installation cost. Further, there is an excessive burning loss of the active carbon.

It is also known to use Joule's heat generated by conducting electric current through the active carbon for heating the same and desorbing or liberating adsorbed material, but this method also needs expensive installation cost, especially for the electrical equipment, as it requires very heavy current.

After repeating many experiments to find out an efficient and economical method for regenerating used active carbon, one of the inventors of the present invention developed and disclosed an apparatus, in which vibration is applied to the active carbon powder while conducting electric current so as to generate spark discharges between particles of the active carbon and liberate the adsorbed material.

(For reference:
 Publication of Japanese Patent Application Disclosure No.52-6393 and
 Japanese Utility Model Registration Application Disclosure No.52-14351)

However, it was found that this process still has the following disadvantages: With carbon particles which contact a longer time with each other, Joule's heat generates locally and consumes a large amount of current, and this causes lowering of efficiency. This also causes difficulties in controlling temperature during the operation, and becomes difficult to recover liberated or desorbed material, even if it is useful, as it decomposes at such high temperature caused by Joule's heat.

SUMMARY OF THE INVENTION

It is an object of the present invention to provide apparatus for regenerating activated carbon which eliminates disadvantages of prior apparatus and achieves quick and uniform regeneration of the activated carbon while minimizing loss of carbon particles.

In accordance with the invention, apparatus for regenerating activated carbon comprises a desorbtion tank having at its bottom an elongate channel-form passage which slopes downwardly from an inlet end to an outlet end. Means is provided for feeding activated carbon to be regenerated into the inlet end of the passage and discharging regenerated activated carbon from the outlet end. During flow of the activated carbon from the inlet end to the outlet end of the passage, it is regenerated by being subjected to voltage pulses applied through electrodes which extend along the passage. At spaced intervals along the passage, the flow of the activated carbon is intercepted by transverse weirs extending up from the bottom of the passage. An oscillatory swinging motion is imparted to the passage to promote flow of the activated carbon from the inlet to the outlet and to cause activated carbon particles which have become lighter by virtue of regeneration to pass preferentially over the weirs and thereby move toward the outlet of the passage. Uniform regeneration of the activated carbon is thereby obtained while minimizing loss. Moreover smooth flow of the activated carbon along the passage is achieved even if the carbon powder is accompanied by sludge which may tend to stick to supporting surfaces.

The invention will be more fully understood from the following description of a preferred embodiment illustrated by way of example in the accompanying drawings.

DESCRIPTION OF PREFERRED EMBODIMENT

Figure 1:
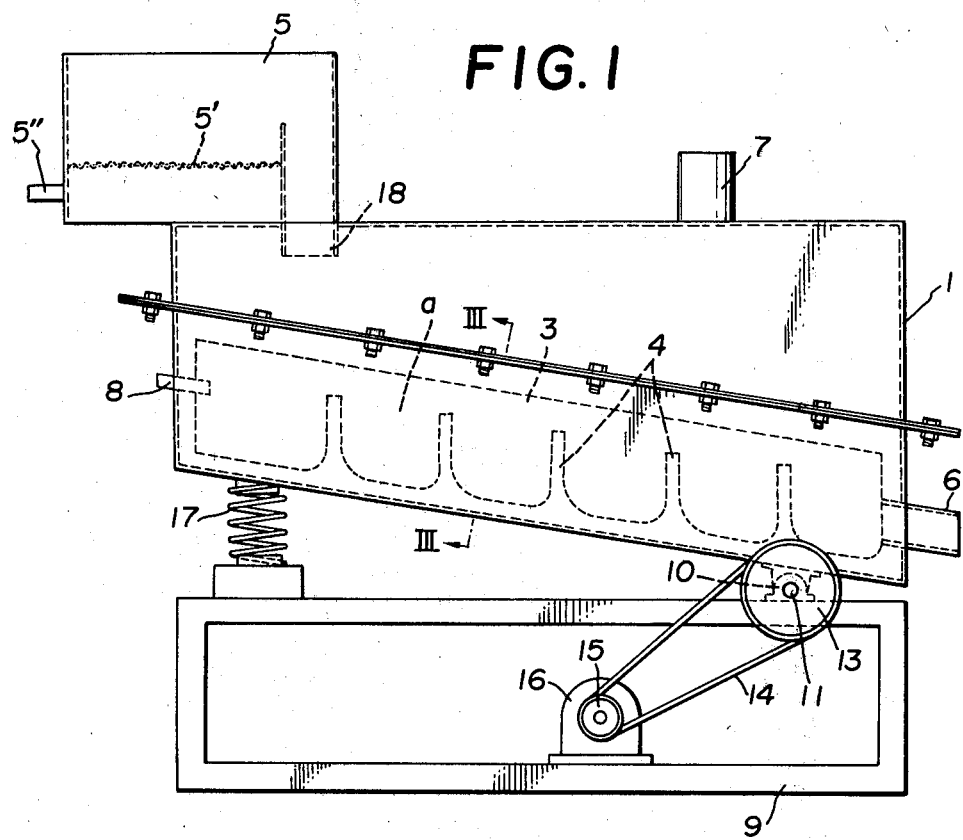
FIG. 1 is a front view illustrating an embodiment of the apparatus for regenerating active carbon according to the present invention.
Figure 2:
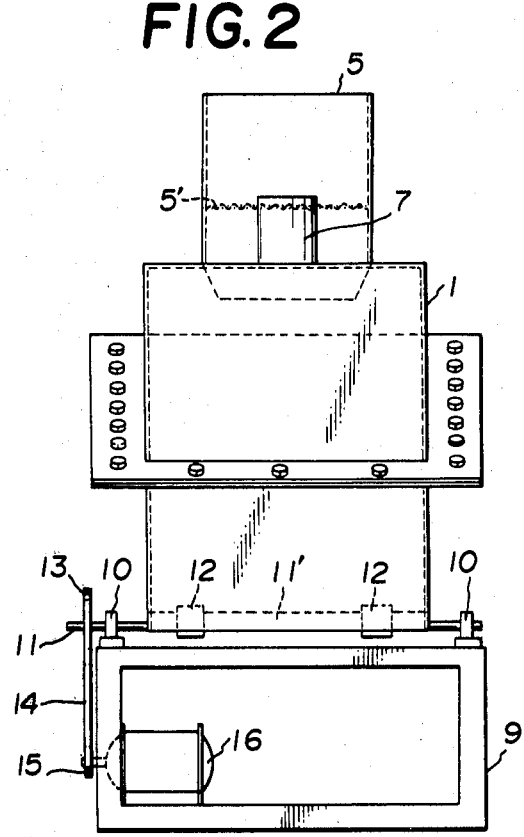
FIG. 2 is a side elevational view of the apparatus shown in FIG. 1.
Figure 3:
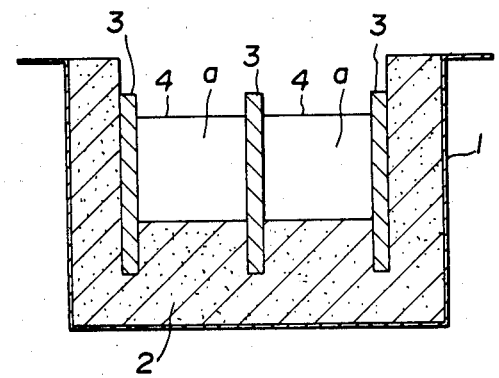
FIG. 3 is an enlarged cross-sectional view, taken along line III—III of FIG. 1.
Figure 5:
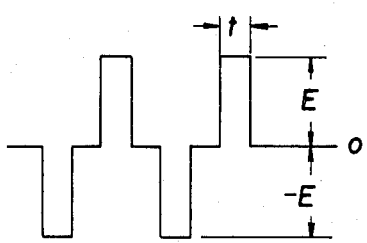
FIG. 5 is an example of wave forms of the applied voltage during the process of the present invention.

As seen in FIGS. 1-3, the apparatus for regenerating active carbon includes a box type desorption tank 1, the bottom of which is slanted lengthwise at a suitable angle, and the inside surface thereof is lined with refractory material 2, and a channel form carrier passage "a" is formed thereon for carrying active carbon powders. Refractory mortar such as LIGHT CASTER or PLYCASTER sold by PLIBRICO CO. or like refractory material of good insulation quality may be used for the lining material 2. Carbon electrodes 3, 3 . . . of plate form are provided within and along said carrier passage "a", each disposed opposedly. Carbon rods may be used also for the electrodes 3. A number of transverse baffle boards 4, 4 . . . of suitable height and made of the similar refractory material as lining material 2, are provided at suitable length intervals within the carrier passage "a". 5 is a dehydrator of the used active carbon, having screen 5' for filtering water. 6 is an outlet port of the regenerated active carbon. 7 is an exhaust port of the desorbed gas. 8 is electrode terminal. Through bearings 12, 12, the lower end of the slanted bottom of desorption tank 1 is mounted on an eccentric journal 11' of a rotary shaft 11 which is supported on a base frame 9 through bearings 10, 10. The rotary shaft 11 is connected with a motor 16 through a pulley 13 mounted on the shaft, belt 14 and a small pulley 15 of the motor. The upper end of the slanted bottom of tank 1 is supported on the base frame 9 through a spring 17. The apparatus will be operated as follows:

By starting the motor 16, desorption tank 1 may swing vertically and longitudinally, while each part thereof moving circularly. Then by charging used active carbon into the dehydrator 5, the wet carbon powders are dehydrated by the screen 5' and fed on upper end of the carrier passage "a" through opening 18. The powders advance downwards on the slanted passage "a" while being intercepted by the baffle boards 4, 4, . . . intermittently, and discharged from the outlet port 6. During this operation, pulse voltage of the form as shown in FIG. 5 is applied between the electrodes 3, 3 . . . . By the application of pulse voltage, or by the combination of pulse voltage and swinging motion of the passage "a", a greater amount of spark discharges are generated between active carbon particles, so that the desorption is accelerated and can be accomplished within a very short period of several to a dozen or so minutes. For generating pulse voltage, thyristor chopper or thyristor Leonard system, as for example, may be used. (In this example, thyristor chopper system was used.)

Further, one of the eminent advantages of this method is to be able to control temperature during the desorbing process, by adjusting pulse width "t".

Figure 4:
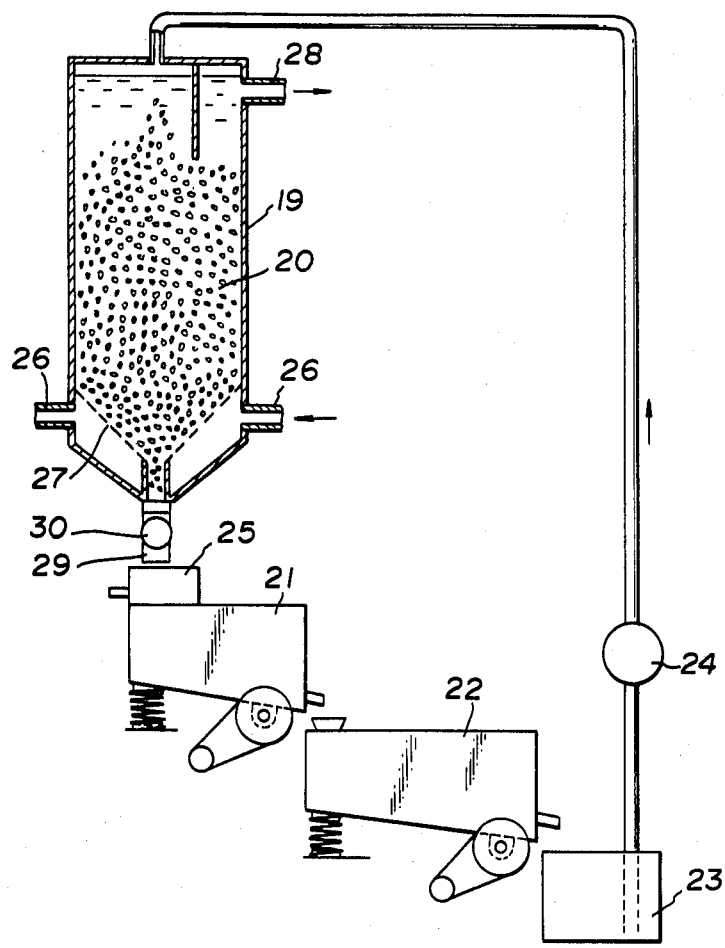
FIG. 4 is a schematic view showing an example of waste water purification apparatus using the regeneration apparatus according to the present invention.

For example, with the pulse width of about 5-10 microsec. at an applied voltage of 200-500V, the temperature rise is minimized, so that the useful adsorbed material can be recovered as it is desorbed without decomposition. Further, loss of the carbon electrodes may be reduced to about 1/100 of that in the prior art. On the contrary, with the pulse width of about 1-10 millisec., temperature rises up to 600°-700° C. within several minutes, so that the harmful substance can be decomposed and burnt out immediately on desorption. Either the A.C. wave form as shown in FIG. 5, or a D.C. wave form without changing of polarity may be used for the pulse voltage. The used active carbon which has been fed on the carrier passage "a" and intercepted by each baffle board 4, desorb the adsorbed material while repeating the swinging motion. Lightened particles due to desorption move upwards and over the upper edge of the board 4, and are then intercepted by the next board, thus the desorption goes on progressively, and, at the final stage, the active carbon which is almost completely activated and regenerated is taken out from the outlet port 6. FIG. 4 shows one example of continuous purification apparatus for waste water, in which the regeneration apparatus according to the present invention is used. In the figure, 19 is an adsorption tank containing active carbon 20 as adsorbent. 21 is a dryer, 22 is a regeneration apparatus of the present invention, 23 is a storage tank of the regenerated active carbon, 24 is a feed pump. In this example, the dryer 21 is of the similar construction as regeneration apparatus 22, and provided with dehydrator 25 on the upper part thereof, but a drying oven with an usual heating means such as hot air may be used also.

The apparatus will be operated as follows

The waste water which flows into the tank 19 through an inlet port 26, passes through filter screen 27 and is removed of the harmful material by adsorption while passing through layers of the adsorbent 20, and discharged from outlet port 28 as purified water. Used active carbon 20 is discharged through a discharge port 29 provided on the bottom of the tank 19, an approximately constant amount at predetermined time intervals, by means of an automatic discharging apparatus 30. The powder 20 is dehydrated by the dehydrator 25, then dried by the dryer 21. If the powder 20 is accompanied with sludges, the same may be carbonized or burnt out at this stage. The dried powder 20 is then activated and regenerated by the regeneration apparatus 22 in the manner described above, and sent to the storage tank 23 as regenerated active carbon powder, and from there sent back to the adsorption tank 19 by means of feed pump 24. Thus, by repeating these processes, purification of the water as well as regeneration of the used active carbon can be performed automatically and continuously without stopping the flow of water.

As mentioned above, in the present invention, by applying a pulse voltage and imparting a swinging motion to the passage, a greater amount of spark discharge is generated so that the desorption of adsorbed material can be performed more easily and efficiently. Another advantage of the present invention is that by adjusting the pulse width, it becomes possible to control the temperature during the desorption. Further, by providing intercepting means such as baffle boards within the swinging carrier passage, it also becomes possible to pass the active carbon particles selectively according to the order of desorption degree. As a result, according to the apparatus of the present invention the desorption is exceedingly accelerated and highly activated active carbon can be obtained within a relatively short time interval. In the above examples, adjustment of the pulse width was performed without changing the frequency. Frequencies of 50-400 Hz were used in the examples.

We claim:

1. Apparatus for regenerating activated carbon comprising a desorption tank having a bottom providing an elongate channel-form passage sloping downwardly from an inlet end to an outlet end, means for feeding activated carbon to be regenerated to said inlet end of said passage, means for discharging regenerated activated carbon from the outlet end of said passage, elongate spaced electrode means extending along said passage, means for generating pulse voltage and supplying said pulse voltage through said electrode means to activate carbon in said passage to regenerate said activated carbon, flow intercepting means provided at spaced length intervals in said passage, and means for imparting to said passage an oscillatory swinging motion to promote flow of said activated carbon along said passage from said inlet to said outlet and to cause activated carbon particles which have become lighter by virtue of regeneration to pass preferentially over said intercepting means and thereby move toward said outlet.

2. Apparatus according to claim 1, in which said passage is of insulating material and said electrodes comprises two electrode plates at opposite sides of said passage and an intermediate electrode plate of opposite polarity between said two electrode plates.

3. Apparatus according to claim 1, in which said intercepting means comprises a plurality of transverse weirs extending up from the bottom of said passage and spaced from one another longitudinally of said passage.

4. Apparatus according to claim 1, in which said means for imparting oscillating swinging motion to said passage comprises a shaft extending transversely of said passage adjacent its outlet end, eccentric means on said shaft engaging bearing means on said tank to impart an orbital movement to said passage, upon rotation of said shaft, and spring means resiliently supporting said tank adjacent the inlet end of said passage.

* * * * *